United States Patent
Schirwitz et al.

(10) Patent No.: US 11,795,323 B2
(45) Date of Patent: *Oct. 24, 2023

(54) POLYCARBONATE COMPOSITION COMPRISING TALC

(71) Applicant: Covestro Deutschland AG, Leverkusen (DE)

(72) Inventors: Christopher Schirwitz, Leverkusen (DE); Michael Erkelenz, Duisburg (DE); Birte Sämisch, Cologne (DE); Alexander Meyer, Düsseldorf (DE)

(73) Assignee: Covestro Deutschland AG, Leverkusen (DE)

( * ) Notice: Subject to any disclaimer, the term of this patent is extended or adjusted under 35 U.S.C. 154(b) by 673 days.

This patent is subject to a terminal disclaimer.

(21) Appl. No.: 16/326,950

(22) PCT Filed: Aug. 23, 2017

(86) PCT No.: PCT/EP2017/071215
§ 371 (c)(1),
(2) Date: Jun. 21, 2021

(87) PCT Pub. No.: WO2018/037037
PCT Pub. Date: Mar. 1, 2018

(65) Prior Publication Data
US 2022/0162442 A1    May 26, 2022

(30) Foreign Application Priority Data
Aug. 24, 2016 (DE) .................. 16185526

(51) Int. Cl.
*C08L 69/00* (2006.01)
*C08K 3/34* (2006.01)
*C08L 23/08* (2006.01)
*C08L 23/14* (2006.01)

(52) U.S. Cl.
CPC ............ *C08L 69/00* (2013.01); *C08K 3/34* (2013.01); *C08K 3/346* (2013.01); *C08L 23/0869* (2013.01); *C08L 23/147* (2013.01); *C08L 2203/206* (2013.01)

(58) Field of Classification Search
None
See application file for complete search history.

(56) References Cited

U.S. PATENT DOCUMENTS

| | | |
|---|---|---|
| 2,991,273 A | 7/1961 | Hechelhammer et al. |
| 2,999,825 A | 9/1961 | Floyd et al. |
| 2,999,846 A | 9/1961 | Schnell et al. |
| 3,028,365 A | 4/1962 | Schnell et al. |
| 3,148,172 A | 9/1964 | Fox |
| 3,271,367 A | 9/1966 | Schnell et al. |
| 3,419,634 A | 12/1968 | Vaughn, Jr. |
| 3,564,077 A | 2/1971 | Brinkmann et al. |
| 3,821,325 A | 6/1974 | Merritt, Jr. et al. |
| 3,879,348 A | 4/1975 | Serini et al. |
| 3,919,353 A | 11/1975 | Castelnuovo et al. |
| 4,584,360 A | 4/1986 | Paul et al. |
| 4,982,014 A | 1/1991 | Freitag et al. |
| 5,097,002 A | 3/1992 | Sakashita et al. |
| 5,235,026 A | 8/1993 | Wulff et al. |
| 5,288,778 A | 2/1994 | Schmitter et al. |
| 5,340,905 A | 8/1994 | Kühling et al. |
| 5,717,057 A | 2/1998 | Sakashita et al. |
| 5,821,380 A | 10/1998 | Holderbaum et al. |
| 5,883,165 A | 3/1999 | Kröhnke et al. |
| 6,596,840 B1 | 7/2003 | Kratschmer et al. |
| 6,737,465 B2 | 5/2004 | Seidel et al. |
| 6,740,730 B1 | 5/2004 | Kratschmer et al. |
| 7,071,284 B2 | 7/2006 | Kauth et al. |
| 8,158,745 B2 | 4/2012 | Wehrmann et al. |
| 8,822,576 B2 | 9/2014 | Taschner et al. |
| 8,916,630 B2 | 12/2014 | Dern et al. |
| 9,296,893 B2 | 3/2016 | Erkelenz et al. |
| 2005/0032961 A1* | 2/2005 | Oguni ................ C08F 8/00 524/115 |
| 2013/0079443 A1 | 3/2013 | Taschner et al. |
| 2013/0267665 A1 | 10/2013 | Huggins et al. |

(Continued)

FOREIGN PATENT DOCUMENTS

| | | |
|---|---|---|
| DE | 1570703 A1 | 2/1970 |
| DE | 1694173 A1 | 6/1971 |
| DE | 2063050 A1 | 7/1972 |
| DE | 2063052 A1 | 7/1972 |
| DE | 2211956 A1 | 10/1973 |
| DE | 2348377 A1 | 4/1975 |
| DE | 3334782 A1 | 10/1984 |
| DE | 3832396 A1 | 2/1990 |
| DE | 102008019503 A1 | 10/2009 |

(Continued)

OTHER PUBLICATIONS

International Search Report for PCT/EP2017/071215 dated Nov. 2, 2017.

(Continued)

*Primary Examiner* — David J Buttner
(74) *Attorney, Agent, or Firm* — THE WEBB LAW FIRM

(57) ABSTRACT

The invention relates to a composition obtainable by mixing polycarbonate, unsized talc and a specific anhydride-modified alpha-olefin polymer, wherein the amounts of the talc and the specific anhydride-modified alpha-olefin polymer are matched to one another such that, for every 10 parts by weight of the talc, 0.10 to 1.4 parts by weight of the anhydride-modified alpha-olefin polymer are used. It has been shown that in situ sizing of talc with the wax can minimize the degradation of the polycarbonate only in the course of mixing with the polycarbonate and, at the same time, properties such as multiaxial impact resistance and flowability can be improved.

18 Claims, No Drawings

(56) References Cited

U.S. PATENT DOCUMENTS

| | | | |
|---|---|---|---|
| 2014/0243467 A1 | 8/2014 | Dern et al. | |
| 2014/0303296 A1 | 10/2014 | Inazawa et al. | |
| 2017/0342262 A1* | 11/2017 | Choi | C08K 3/34 |
| 2019/0233644 A1* | 8/2019 | Yamaguchi | C08K 5/098 |
| 2022/0220301 A1* | 7/2022 | Schirwitz | C08J 3/005 |

FOREIGN PATENT DOCUMENTS

| | | |
|---|---|---|
| EP | 0500496 A1 | 8/1992 |
| EP | 0517044 A2 | 12/1992 |
| EP | 0839623 A1 | 5/1998 |
| EP | 1860155 A1 | 11/2007 |
| EP | 2574642 A1 | 4/2013 |
| EP | 2787041 A1 | 10/2014 |
| FR | 1561518 A | 3/1969 |
| GB | 1122003 A | 7/1968 |
| GB | 1229482 A | 4/1971 |
| GB | 1367788 A | 9/1974 |
| GB | 1367790 A | 9/1974 |
| JP | S6162039 A | 3/1986 |
| JP | S6162040 A | 3/1986 |
| JP | S61105550 A | 5/1986 |
| JP | H07238213 A | 9/1995 |
| JP | H08188708 | 7/1996 |
| JP | 2000-057744 A | 2/2000 |
| JP | 2002-292799 A | 10/2002 |
| JP | 2007-126499 A | 5/2007 |
| JP | 2012-020544 A | 2/2012 |
| JP | 2015-096568 A | 5/2015 |
| KR | 10-0699967 B1 | 3/2007 |
| KR | 10-2014-0069242 A | 6/2014 |
| WO | WO-9615102 A2 | 5/1996 |
| WO | WO-200105866 A1 | 1/2001 |
| WO | WO-200105867 A1 | 1/2001 |
| WO | 01/48074 A1 | 7/2001 |
| WO | WO-2004063249 A1 | 7/2004 |
| WO | WO-2013045552 A1 | 4/2013 |
| WO | 2013/081161 A1 | 6/2013 |
| WO | WO-2013079634 A1 | 6/2013 |
| WO | WO-2015052110 A1 | 4/2015 |
| WO | WO-2015189753 A1 | 12/2015 |
| WO | WO2016/108539 * | 7/2016 |

OTHER PUBLICATIONS

International Preliminary Report on Patentability received for PCT Patent Application No. PCT/EP2017/071215, dated Mar. 7, 2019, 16 pages (10 pages of English Translation and 6 pages of Original Document).

* cited by examiner

POLYCARBONATE COMPOSITION COMPRISING TALC

CROSS-REFERENCE TO RELATED APPLICATIONS

This application is a national stage application (under 35 U.S.C. § 371) of PCT/EP2017/071215, filed Aug. 23, 2017, which claims benefit of European Application No. 16185526.7, filed Aug. 24, 2016, both of which are incorporated herein by reference in their entirety.

The present invention relates to a composition comprising a polycarbonate, talc, the talc used being unsized, and a specific anhydride-modified alpha-olefin polymer, wherein the amounts of the talc and the specific anhydride-modified alpha-olefin polymer have a particular ratio. The present invention further relates to processes for sizing talc, to the production of the composition according to the invention, to the use thereof for production of mouldings, and to the mouldings themselves. The composition of the invention is used particularly for production of mouldings having improved multiaxial impact resistance. The invention also relates to the stabilization of polycarbonate in a composition to which unsized talc is added.

It is known that the addition of talc to molten polycarbonates leads to degradation of the polymer chains, which is ultimately manifested in poorer mechanical properties of the resulting moulded polycarbonate articles. The reinforcement of polycarbonates by the filler talc is desirable for many applications owing to the thermal conductivity of talc.

In order nevertheless to achieve moulded articles comprising polycarbonates and talc with adequate mechanical properties, stabilized compositions are used for the production of the moulded articles. A starting point here is the prior sizing of the talc, which chemically masks the basic groups of the talc responsible for the ester hydrolysis in the polycarbonate, and hence degradation of the polymer chains can essentially be prevented. However, such sizing of the talc constitutes an additional process step to which the talc filler has to be subjected beforehand. Such an additional process step is always associated with increased costs and time demands and is therefore disadvantageous.

JP 08-188708 A discloses compositions containing 45% to 97% by weight of an aromatic polycarbonate with 3% to 55% by weight of an inorganic filler (glass flakes, metal flakes, mica or talc) and 0.02% to 3% by weight, preferably 0.03% to 1% by weight, of an olefinic wax (corresponding to 0.006 to 3.33 parts wax to 10 parts filler) containing carboxylic groups or derivatives thereof. This document too points out that, when talc is used as filler, a silane-coated material should be used in order to avoid basic degradation of the polycarbonate. Example 11 describes a composition comprising 0.05 parts wax to 10 parts talc. However, JP 08-188708 A does not give any hint at all as to how the additional step of prior sizing of the filler can be avoided. More particularly, this document does not give any hint at all as to the optimization of the wax used in relation to the talc filler and the resulting properties of the moulded articles, especially the multiaxial impact resistance.

JP 07-238213 A describes compositions which, as well as an aromatic polycarbonate, a graft-modified olefin rubber, a polyorganosiloxane rubber and a reinforcing fibre, comprise one or more olefinic waxes and/or olefinic polymers having carboxylic or carboxylic anhydride groups. This discloses amounts in the range from 0.02 to 150 parts wax to 10 parts fibres. This document talks exclusively about reinforcement by fibres that have advantageously been sized. Talc and fibres have different behaviours in terms of their reinforcing effect.

WO 2013/045552 A1 describes a polycarbonate composition containing 2 to 40 parts by weight of an inorganic filler which may be talc among other substances, and 0.01 to 0.5 part by weight of an anhydride-modified alpha-olefin terpolymer. Some examples of WO 2013/045552 A1 describe the use of 0.5 or 1.0 part of a wax to 10 parts glass fibres or quartz flour. Talc is not used in the examples. The specific problems with degradation through the use of talc are not addressed overall. Nor can the person skilled in the art infer any teaching from this document as to possible optimization of the wax to be used in relation to talc and any possible improvement in multiaxial impact resistance.

WO 2013/079634 A1 discloses compositions comprising aromatic polycarbonate, a flame retardant, a rubber-free anhydride-modified alpha-olefin terpolymer, a glass fibre and an antidripping agent. It is possible here to use 0.20 to 1.50 parts by weight of the rubber-free anhydride-modified alpha-olefin terpolymer for 5.0 to 40.0 parts by weight of the glass fibres (corresponding to 0.05 to 3 parts by weight of the rubber-free anhydride-modified alpha-olefin terpolymer per 10 parts glass fibres). In the examples, 0.7 part of a wax is used per 10 parts of a glass fibre and the effect thereof on multiaxial impact resistance (puncture impact experiment according to ISO 6603-2) is examined. However, this document does not give any pointer as to what effect specific waxes have on talc as filler.

Proceeding from the prior art, it was an object of the present invention to provide a composition comprising a polycarbonate and talc as filler, wherein the use of pretreated talc, i.e. the use of sized talc, can be avoided. More particularly, these compositions shall still retain the properties known from the prior art, such as good flowability, high stiffness and high toughness. Preferably, the profile of properties comprising flowability, high stiffness and high toughness shall be improved over the prior art. More particularly, it was an object of the present invention to provide a composition comprising a polycarbonate and talc as filler, in which unsized talc is used and from which moulded articles having good, preferably improved, multiaxial impact resistance, especially according to DIN EN ISO 6603-2:2002, and reinforcement (modulus of elasticity) can be obtained. In addition, the compositions according to the invention have good thermal conductivity, especially in the area of an injection moulding tested according to ASTM E 1461. Compositions having low to moderate thermal conductivity in the range from 0.3 to 2 W/(mK) are especially advantageous for the production of mouldings such as housings or housing parts in the electronics sector, housings for mobile electronics or bodywork parts in the automotive sector.

This object was achieved by the provision of the compositions according to the invention, the process according to the invention for sizing talc, the moulding according to the invention and the use according to the invention, all of which are elucidated in detail below.

It has been found that, surprisingly, the mixing of a specific wax having a specific acid number and a specific molecular weight with an unsized talc, especially a talc having an alkaline pH, preferably of 8 to 10, from the juncture of addition of the talc as filler to the polycarbonate melt, can achieve sizing sufficient to reduce the degradation of the ester groups of the polycarbonate. This means that an unsized talc B), which is also understood to mean a talc mixture, can be added directly to polycarbonate A) without pretreatment if an anhydride-modified alpha-olefin polymer C) is added simultaneously. Even though the talc is unsized, there is sufficient adsorption of the wax C) on the surface of the talc B) in the course of mixing of components A) to C) ("in situ sizing").

The object is also achieved by the use of anhydride-modified alpha-olefin polymer having an acid number, determined by means of potentiometric titration with alcoholic potassium hydroxide solution according to DIN ISO 17025: 2005, of at least 30 mg KOH/g and a mean molecular weight $M_W$ of 4000 to 40 000 g/mol, where the mean molecular weight $M_W$ is determined by means of gel permeation chromatography in ortho-dichlorobenzene at 150° C. with polystyrene calibration, for stabilization of polycarbonate in a composition to which unsized talc is added, wherein, for every 10 parts by weight of the unsized talc, 0.10 to 1.4 parts by weight, preferably 0.3 to 1.0 part by weight, of the anhydride-modified alpha-olefin polymer are used. Preferably, the composition does not contain any polyester or any graft polymer, and most preferably no impact modifier at all apart from the anhydride-modified alpha-olefin polymer, which is sometimes described in the literature as an impact modifier, of component C).

It is a feature of the compositions of the invention that it is actually even possible in this way to improve the properties such as good flowability, high stiffness and high toughness of the polycarbonate/talc compositions with respect to the prior art. This makes it possible to avoid the additional step of pretreatment of the talc or talc mixture B) with a size, and hence to provide a composition that can be produced in a less costly and more efficient manner It has been observed here that the acid number and molar mass of the wax C) have an effect on the efficiency of the in situ sizing and also on the resulting properties of a moulded article obtainable from the composition according to the invention. More particularly, it has been found that, surprisingly, a minimum amount of a specific wax C) has to be present in order that the level of properties can be maintained or even improved. At the same time, an excessive amount of wax has an adverse effect on the multiaxial impact resistance of the resulting moulded article. Only with a particular acid number and molar mass of the wax C) and an optimized ratio of talc to wax is it possible to obtain compositions having good multiaxial impact resistance with the compositions according to the invention, in spite of use of an unsized talc or talc mixture B).

It has also been found that, surprisingly, the flowability of the composition according to the invention is improved over polycarbonate prior to mixing with components B) and C). This could not have been expected as such by the person skilled in the art, especially not when the composition does not contain any polyester as impact modifier. Even in the case of high filling levels with talc, this effect can be observed.

The present invention therefore provides a composition obtainable by mixing at least components A) to C), wherein
A) is a polycarbonate,
B) is unsized talc, and
C) is at least one anhydride-modified alpha-olefin polymer having an acid number of at least 30 mg KOH/g, determined by means of potentiometric titration with alcoholic potassium hydroxide solution according to DIN ISO 17025:2005, and a mean molecular weight $M_W$ of 4000 to 40 000 g/mol, where the mean molecular weight $M_W$ is determined by means of gel permeation chromatography in ortho-dichlorobenzene at 150° C. with polystyrene calibration, wherein the amounts of components B) and C) prior to mixing with component C) are matched to one another such that, for every 10 parts by weight of component B), 0.10 to 1.4 parts by weight of component C) are used, and wherein the composition is free of graft polymers and polyesters, preferably free of impact modifiers other than component C)—which is sometimes also referred to as an impact modifier in the literature.

In the context of the present invention, the term "mixing" preferably means the "contacting" of components A) to C). Preference is given to using mechanical aids for this purpose. The mixing takes place at temperatures where component A) has at least partly melted. The mixing preferably takes place at temperatures in the range from 250° C. to 350° C. Particular preference is given to temperatures of 260° C. to 310° C. for essentially bisphenol A-based polycarbonates. "Essentially" here means a proportion of preferably at least 90% by weight, further preferably at least 95% by weight, most preferably at least 98% by weight, of bisphenol A, based on the total amount of diphenols used. For copolycarbonates with, for example, diphenols selected from 1,1-bis(4-hydroxyphenyl)-3,3,5-trimethylcyclohexane, diphenols of the formulae (I), (II) and/or (III) shown below and/or siloxane-containing copolycarbonates, the temperatures are preferably in the range from 280° C. to 350° C. The mixing can be conducted in customary compounding units. Preference is given to screw extruders, ring extruders or (co-) kneaders.

Component A)

Component A) is at least one polycarbonate. It is thus also possible to use mixtures as component A). For the purposes of the present invention, polycarbonates are either homopolycarbonates or copolycarbonates; the polycarbonates can, as is known, be linear or branched. Preferably, the at least one polycarbonate is an aromatic polycarbonate.

The polycarbonates are prepared in a known manner from diphenols, carbonic acid derivatives, and optionally chain terminators and branching agents. In the case of homopolycarbonates only one diphenol is employed and in the case of copolycarbonates two or more diphenols are employed. For preparation of the copolycarbonates according to the invention, it is likewise possible to use 1% to 25% by weight, preferably 2.5% to 25% by weight, based on the total amount of diphenols to be used, of polydiorganosiloxanes having hydroxyaryloxy end groups. These are known (e.g. U.S. Pat. No. 3,419,634 A) and can be prepared by processes known from the literature. Likewise suitable are polydiorganosiloxane-containing copolycarbonates; the preparation of polydiorganosiloxane-containing copolycarbonates is described in DE-A 3 334 782 for example.

Polycarbonates are prepared for example by reaction of diphenols with carbonyl halides, preferably phosgene, and/or with dicarbonyl dihalides, preferably aromatic dicarbonyl dihalides, preferably benzenedicarbonyl dihalides, by the interfacial process, optionally with use of chain terminators and optionally with use of trifunctional or more than trifunctional branching agents. Another possibility is preparation by way of a melt polymerization process via reaction of diphenols with, for example, diphenyl carbonate.

Diphenols suitable for preparing polycarbonates are for example hydroquinone, resorcinol, dihydroxybiphenyls, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes, phthalimidines derived from isatin derivatives or from phenolphthalein derivatives, and also the related ring-alkylated, ring-arylated and ring-halogenated compounds.

Preferred diphenols are selected from at least one from the group of 4,4'-dihydroxydiphenyl, 2,2-bis(4-hydroxyphenyl) propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane, and also the diphenols (I) to (III)

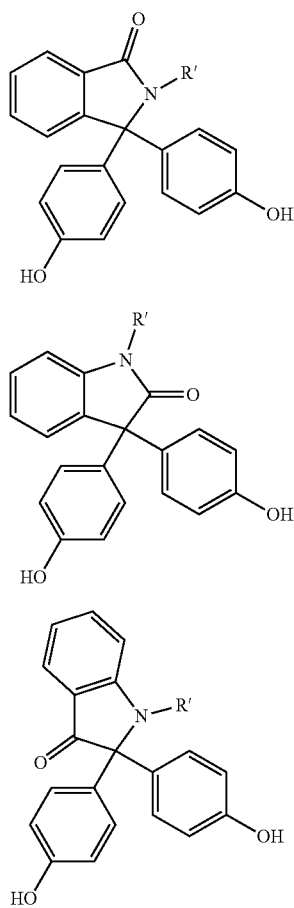

in which R' in each case is $C_1$- to $C_4$-alkyl, aralkyl or aryl, preferably methyl or phenyl, most preferably methyl.

Particularly preferred diphenols are selected from at least one from the group consisting of 2,2-bis(4-hydroxyphenyl) propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane, dimethylbisphenol A and the diphenols of the formulae (I), (II) and/or (III).

These and other suitable diphenols are described for example in U.S. Pat. Nos. 3,028,365, 2,999,825, 3,148,172, 2,991,273, 3,271,367, 4,982,014 and 2,999,846, in DE-A 1 570 703, DE-A 2063 050, DE-A 2 063 052, DE-A 2 211 956 and DE-A 3 832 396, in FR-A 1 561 518, in the monograph "H. Schnell, Chemistry and Physics of Polycarbonates, Interscience Publishers, New York 1964" and also in JP-A 62039/1986, JP-A 62040/1986 and JP-A 105550/1986.

Examples of suitable carbonic acid derivatives include phosgene or diphenyl carbonate.

Suitable chain terminators that may be used in the preparation of polycarbonates are monophenols. Suitable monophenols are for example phenol itself, alkylphenols such as cresols, p-tert-butylphenol, cumylphenol and mixtures thereof.

Preferred chain terminators are the phenols mono- or polysubstituted by linear or branched $C_1$- to $C_{30}$-alkyl radicals, preferably unsubstituted or substituted by tert-butyl. Particularly preferred chain terminators are phenol, cumylphenol and/or p-tert-butylphenol.

The amount of chain terminator to be employed is preferably 0.1 to 5 mol % based on the moles of diphenols employed in each case. The chain terminators can be added before, during or after the reaction with a carbonic acid derivative.

Suitable branching agents are the trifunctional or more than trifunctional compounds familiar in polycarbonate chemistry, in particular those having three or more than three phenolic OH groups.

Suitable branching agents are for example 1,3,5-tri(4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, tetra(4-hydroxyphenyl)methane, tetra (4-(4-hydroxyphenylisopropyl)phenoxy)methane and 1,4-bis((4',4"-dihydroxytriphenyl)methyl)benzene and 3,3-bis (3-methyl-4-hydroxyphenyl)-2-oxo-2,3-dihydroindole.

The amount of the branching agents for optional employment is preferably from 0.05 mol % to 2.00 mol % based on moles of diphenols used in each case.

The branching agents can either be initially charged with the diphenols and the chain terminators in the aqueous alkaline phase or added dissolved in an organic solvent before the phosgenation. In the case of the transesterification process the branching agents are employed together with the diphenols.

Preferred modes of production of the polycarbonates for use in accordance with the invention, including the polyestercarbonates, are the known interfacial process and the known melt transesterification process (cf. for example WO 2004/063249 A1, WO 2001/05866 A1, WO 2000/105867, U.S. Pat. Nos. 5,340,905, 5,097,002, 5,717,057).

In the first case, the acid derivatives used are preferably phosgene and optionally dicarbonyl dichlorides; in the latter case, they are preferably diphenyl carbonate and optionally dicarboxylic diesters. Catalysts, solvents, workup, reaction conditions etc. for the polycarbonate preparation or polyestercarbonate preparation have been described and are known to a sufficient degree in both cases.

Particularly preferred polycarbonates are the homopolycarbonate based on bisphenol A, the homopolycarbonate based on 1,1-bis(4-hydroxyphenyl)-3,3,5-trimethylcyclohexane, and also copolycarbonates based on the two monomers bisphenol A and 1,1-bis(4-hydroxyphenyl)-3,3,5-trimethylcyclohexane. Likewise preferred are siloxane-containing polycarbonates as described above, more preferably formed from dimethylsiloxanes with bisphenol A as monomer units.

The polycarbonates, apart from the siloxane-containing polycarbonates, the molecular weight of which is specified in the description of the siloxane-containing polycarbonates, preferably have a weight-average molecular weight $M_w$ of 15 000 g/mol to 40 000 g/mol, more preferably of 18 000 g/mol to 35 000 g/mol, most preferably of 22 000 g/mol to 32 000 g/mol, measured by gel permeation chromatography in accordance with DIN 55672-1:2016-03 using a bisphenol A polycarbonate calibration and dichloromethane as eluent, by the 2301-0257502-09D method (from 2009 in German) from the company Currenta GmbH & Co. OHG, Leverkusen. Likewise preferably, the molecular weight is determined with a PSS SECcurity System; polycarbonate calibration, dichloromethane as eluent, column 1 (PL-PC5) with a concentration of 2 g/l, flow rate 1.0 ml/min, at a temperature of 30° C. using UV and/or RI detection.

The siloxane-containing polycarbonates (also referred to hereinafter as SiCoPC) refer to block cocondensates having the following structural units:

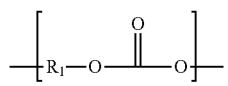
(1)

where R1 is a divalent substituted or unsubstituted aromatic radical, a divalent linear or cyclic aliphatic radical, or the structural unit (1) is a mixture of units, where R1 is a divalent substituted or unsubstituted aromatic radical or R1 is a divalent linear or cyclic aliphatic radical. The proportion of aromatic R1 radicals is 60%-100% by weight and the proportion of aliphatic radicals is 0%-40% by weight, based on the sum total of diphenols of the formula (3) used in % by weight, and

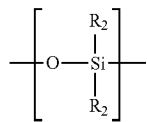
(2)

where R2 is independently a linear or branched aliphatic radical, preferably $C_1$- to $C_{12}$-alkyl, more preferably $C_1$- to $C_4$-alkyl, especially methyl, or a substituted or unsubstituted aromatic radical, preferably phenyl.

Very particularly preferred structural units (2) are dimethylsiloxane units, diphenylsiloxane units, methyl/phenylsiloxane units or mixtures of dimethylsiloxane and diphenylsiloxane units.

In the structural unit (1), R1 is preferably derived from dihydroxyaryl compounds corresponding to the formula (3):

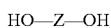
(3)

in which

Z is an aromatic radical which has 6 to 30 carbon atoms and may comprise one or more aromatic rings, may be substituted and may comprise aliphatic radicals or alkylaryls or heteroatoms as bridging elements.

Preferably, Z in formula (3) is a radical of the formula (3a)

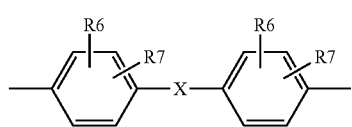
(3a)

in which

R6 and R7 are independently H, $C_1$- to $C_{18}$-alkyl-, $C_1$- to $C_{18}$-alkoxy, halogen such as Cl or Br, or in each case optionally substituted aryl or aralkyl, preferably independently H or $C_1$- to $C_{12}$-alkyl, more preferably H or $C_1$- to $C_8$-alkyl and most preferably H or methyl, and X is —CO—, —O—, —S—, $C_1$- to $C_6$-alkylene, $C_2$- to $C_5$-alkylidene, $C_6$- to $C_{10}$-cycloalkylidene, or is $C_6$- to $C_{12}$-arylene which may optionally be fused to further aromatic rings containing heteroatoms.

Preferably, X to $C_1$- to $C_5$-alkylene, $C_2$- to $C_5$-alkylidene, $C_6$- to $C_9$-cyclohexylidene, —O—, —SO—, —CO—, —S—, —SO$_2$—, more preferably isopropylidene, 3,3,5-trimethylcyclohexylidene or —O—, especially isopropylidene.

Examples of diphenols of formula (3) that are suitable for the production of the SiCoPCs according to the invention include hydroquinone, resorcinol, bis(hydroxyphenyl)alkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, [alpha],[alpha]'-bis(hydroxyphenyl)diisopropylbenzenes and also the alkylated, ring-alkylated and ring-halogenated compounds thereof.

Further-preferred diphenols of the formula (3) are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,2-bis(3-methyl-4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,3-bis[2-(3,5-dimethyl-4-hydroxyphenyl)-2-propyl]benzene, 1,1-bis(4-hydroxyphenyl)cyclohexane and 1,1-bis(4-hydroxyphenyl)-3,3,5-trimethylcyclohexane.

Particularly preferred diphenols of the formula (3) are 2,2-bis(4-hydroxyphenyl)propane (BPA), hydroquinone, 1,1-bis(4-hydroxyphenyl)-3,3,5-trimethylcyclohexane and 2,2-bis(3-methyl-4-hydroxyphenyl)propane.

These and further suitable diphenols are commercially available and are described, for example, in "H. Schnell, Chemistry and Physics of Polycarbonates, Interscience Publishers, New York 1964, p. 28 ff; p. 102 ff", and in "D. G. Legrand, J. T. Bendler, Handbook of Polycarbonate Science and Technology, Marcel Dekker New York 2000, p. 72 ff."

In one embodiment, the siloxane block may have the following structure (4)

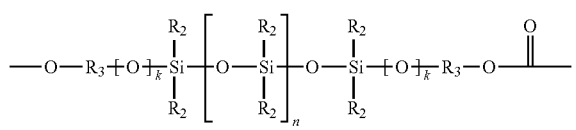
(4)

where R2 has the definition given above, n is an average number from 10 to 400, preferably 10 to 100, more preferably 15 to 50, and k is 0 or 1.

R3 independently comprises the following structural elements (5) or (6):

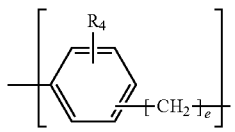
(5)

where R4 is independently hydrogen, halogen and/or in each case a $C_1$ to $C_{10}$, preferably a $C_1$ to $C_4$, linear or branched, unsubstituted or mono- to tetrasubstituted alkyl radical or alkoxy radical, the alkyl and alkoxy radicals preferably being unsubstituted, and $R_4$ especially preferably being hydrogen, e is 0 or a natural number from 2 to 12, preferably 2 to 6, where, in the case that e is 0, k is 1;

or structural element of the formula (6)

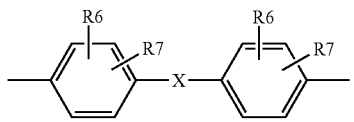
(6)

where R6, R7 and X have the definitions given in formula (3a).

For example and with preference, the siloxane block may comprise the following structures:

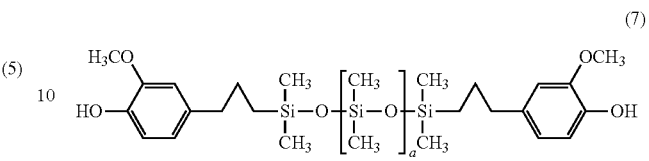
(7)

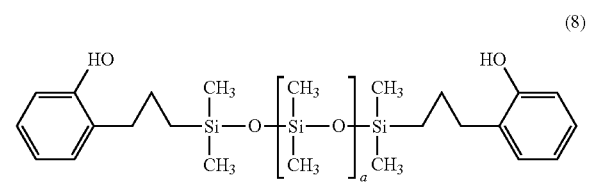
(8)

where a in the formulae (7) and (8) is an average number from 10 to 400, preferably 10 to 100 and more preferably 15 to 50.

In a further embodiment, the abovementioned siloxane blocks can be joined singly or multiply via terephthalic acid or isophthalic acid to form the following structural elements shown by way of example:

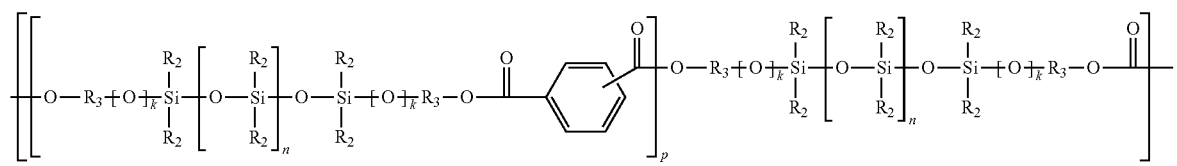
(9)

where p is 0 to 1,

R2, R3, n and k have the definitions given above for the structural element (4).

Corresponding siloxane blocks for reaction with polycarbonate or for reaction with diphenols of the formula (3) or (3a) with phosgene or diaryl carbonates each have terminal phenolic OH groups, i.e.

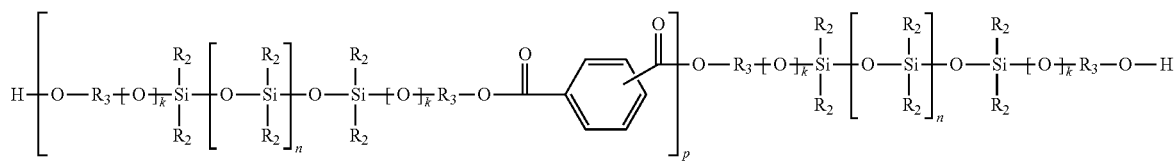
(9a)

where R2, R3, n, k and p have the definitions given above for the structural element (9).

Preferred siloxane blocks are hydroxyaryl-terminated polysiloxane and correspond to the formula (10)

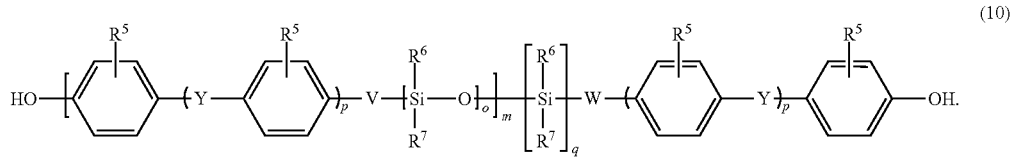

In the general formula (10), $R^5$ is hydrogen or $C_1$- to $C_4$-alkyl, $C_1$- to $C_4$-alkoxy, preferably hydrogen or methyl, methyloxy, more preferably hydrogen.

$R^6$ and $R^7$ are independently aryl, preferably phenyl, $C_1$- to $C_4$-alkyl, preferably methyl, especially methyl.

Y is a single bond, —CO—, —O—, $C_1$- to $C_5$-alkylene, $C_2$- to $C_5$-alkylidene or a $C_5$- to $C_6$-cycloalkylidene radical which may be mono- or polysubstituted by $C_1$- to $C_4$-alkyl, preferably a single bond, —O—, isopropylidene or a $C_5$- to $C_6$-cycloalkylidene radical which may be mono- or polysubstituted by $C_1$- to $C_4$-alkyl, and especially isopropylidene.

V is oxygen, $C_1$- to $C_6$-alkylene or $C_2$- to $C_5$-alkylidene, preferably a single bond, oxygen, $C_3$-alkylene, especially oxygen or isopropylidene.

W is a single bond, S, $C_1$- to $C_6$-alkylene or $C_2$- to $C_5$-alkylidene, preferably a single bond, $C_3$-alkylene or isopropylidene, where W is not a single bond when q is 1.

p and q are each independently 0 or 1.

o is an average number of repeat units from 10 to 400, preferably 10 to 100, more preferably from 15 to 50, and m is an average number from 1 to 10, preferably from 1 to 6 and more preferably from 1.5 to 5.

Especially preferred are siloxanes of the formulae (11) and (12)

m is an average number from 1 to 10, preferably from 1 to 6 and especially preferably from 1.5 to 5. The molecular weight of the siloxane blocks is 3000 g/mol to 20 000 g/mol, preferably 3500 g/mol to 15 000 g/mol, determined by means of gel permeation chromatography (GPC) and polycarbonate from bisphenol A as diphenol as standard, as described above.

The preparation of the siloxane blocks is known in principle and they can be prepared by processes as described, for example, in US 2013/0267665 A1.

The preparation of polycarbonates is likewise known. The polycarbonates are prepared in a known manner from diphenols, carbonic acid derivatives, and optionally chain terminators and branching agents.

Details of the production of polycarbonates have been set out in many patent specifications during the last approximately 40 years. Reference may be made here merely by way of example to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouverté, BAYER AG, "Polycarbonates" in Encyclopedia of Polymer Science and Engineering, Volume 11, Second Edition, 1988, pages 648-718 and finally to Dres. U. Grigo, K. Kirchner and P. R. Müller "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hanser Verlag Munich, Vienna 1992, pages 117-299.

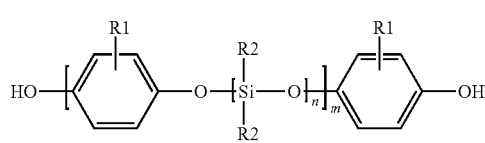

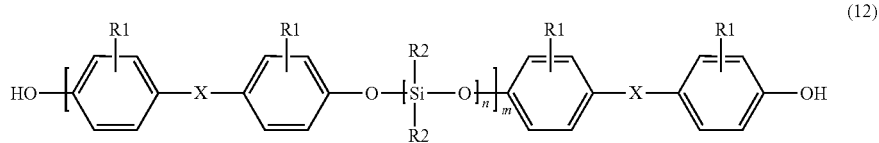

where R1 is H, Cl, Br or $C_1$- to $C_4$-alkyl, preferably H or methyl, and especially preferably hydrogen, R2 is aryl or $C_1$- to $C_4$-alkyl, preferably methyl, X is a single bond, —SO$_2$—, —CO—, —O—, —S—, $C_1$- to $C_6$-alkylene, $C_2$- to $C_5$-alkylidene, or is $C_6$- to $C_{12}$-arylene which may optionally be fused to further aromatic rings containing heteroatoms.

Preferably, X is a single bond, isopropylidene, 3,3,5-trimethylcyclohexylidene or oxygen, and most preferably isopropylidene, n is an average number from 10 to 400, preferably 10 to 100, more preferably 10 to 50, Preferred modes of preparation for the polycarbonates are the known interfacial process and the known melt transesterification process (for example WO 2004/063249 A1, WO 2001/05866 A1, WO 2000/105867, U.S. Pat. Nos. 5,340,905, 5,097,002, 5,717,057).

The content of siloxane blocks in the SiCoPC is greater than 0%, preferably 0.5% to 40% by weight, preferably 1% to 20% by weight, especially preferably 2% to 15% by weight and most preferably 2% to 10% by weight, based in each case on the siloxane blocks used and polycarbonate blocks. Correspondingly, the proportion of polycarbonate blocks in the block cocondensate is 60% to less than 100% (preferably 99.5%) by weight, preferably 99% to 80% by weight, especially preferably 98% to 85% by weight and most preferably 98% to 90% by weight.

The abovementioned siloxane blocks are preferably reacted with polycarbonates having molecular weights of 15 000 to 27 000 g/mol, especially preferably of 17 000 to 27 000 g/mol and especially preferably of 18 000 to 26 500 g/mol (measured by means of GPC with BPA polycarbonate as standard, as described above).

The diphenols for preparation of the polycarbonates are the abovementioned structural units (3).

The individual components (siloxane block and polycarbonate block) are reacted here by the reactive extrusion process, or alternatively the siloxane blocks with diphenols of the formula (3), are reacted with phosgene or diaryl carbonates by the known interfacial process. There are manifold descriptions of this process for polycarbonate synthesis in the literature; reference is made by way of example to H. Schnell, Chemistry and Physics of Polycarbonates, Polymer Reviews, vol. 9, Interscience Publishers, New York 1964 p. 33 ff., to Polymer Reviews, vol. 10, "Condensation Polymers by Interfacial and Solution Methods", Paul W. Morgan, Interscience Publishers, New York 1965, ch. VIII, p. 325, to Dres. U. Grigo, K. Kircher and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna, 1992, p. 118-145, and to EP-A 0 517 044. The conversion of polyorganosiloxanes in the interfacial process is described, for example, in U.S. Pat. No. 3,821,325 A.

The SiCoPCs can be prepared in a reactive extrusion process as described, for example, in WO 2015/052110 A1.

Component B)

According to the invention, unsized talc is used as component B). This means that the talc does not have any size before being mixed with component A).

Talc in the context of the present invention is preferably a talc of essentially the same chemical composition, particle diameter, porosity and/or BET surface area, or a talc mixture.

Talc is generally a sheet silicate. It can be described as magnesium silicate hydrate having the general chemical composition $Mg_3[Si_4O_{10}(OH)_2]$. However, different types of talc contain different impurities, and so there may be deviations from this general composition.

According to the invention, the talc or talc mixture is unsized at the juncture of addition to component A) and C). In the context of the present invention, a size is considered to be a controlled (chemi- or physisorbed) enrichment of molecules other than talc, especially $Mg_3[Si_4O_{10}(OH)_2]$, at the surface. Unsized talc is thus non-surface-treated talc, meaning that, after the talc particles having the desired particle diameter have been recovered and optionally subjected to compaction, the talc preferably has not been subjected to any further process step that alters the surface of the talc in a controlled manner by chemisorption or physisorption. However, this does not rule out the unintentional arrival of impurities, dust or similar particles on parts of the surface during the further handling of the talc, provided that the surface of the talc does not lose its properties to any significant degree, especially in relation to the pH. According to the invention, the talc is only sized by the mixing with component C).

Preferably, the talc has a pH of 8 to 10, more preferably 8.5 to 9.8, even more preferably 9.0 to 9.7, where the pH is determined according to EN ISO 787-9:1995. It should be noted that EN ISO 787-9:1995 also mentions the option of addition of ethanol or other organic solvents to improve the dispersion of the solids to be analysed. Preference is given in accordance with the invention to using distilled water only for determination of the pH according to EN ISO 787-9:1995.

Component B) preferably has an iron(II) oxide and/or iron(III) oxide content of 0.2% to 2.5% by weight, more preferably 0.3% to 2.3% by weight, most preferably from 0.3% to 2.0% by weight. This content is preferably measured by x-ray fluorescence or atomic absorption spectroscopy. It has been found that the iron oxide content in the talc has an influence on the degree of degradation of the polycarbonate. Within the range of iron oxide contents specified in accordance with the invention, particularly good results have been achieved in relation to the reduction in the degradation of the polycarbonate.

Likewise preferably, component B) has an aluminium oxide content of 0.01% to 0.5% by weight, more preferably of 0.05% to 0.48% by weight, most preferably from 0.15% to 0.45% by weight.

Component B) preferably has a median particle diameter D50 of 0.01 to 9.5 μm, more preferably 0.25 to 8.00 μm, further preferably 0.5 to 6.00 μm and most preferably 0.5 μm to not more than 3.0 μm, where the particle diameter D50 is determined by sedimentation analysis. The median $D_{50}$ is understood by the person skilled in the art to mean a mean particle diameter at which 50% of the particles are smaller than the defined value. Preferably, the particle diameter $D_{50}$ is determined according to ISO13317-3:2001.

Component B) preferably has a BET surface area of 7.5 to 20.0 m$^2$/g, more preferably of 9.0 to 15.0 m$^2$/g, most preferably 9.5 to 14.0 m$^2$/g. The determination of the surface area according to Brunauer, Emmett and Teller by means of gas adsorption is known per se to those skilled in the art. Preferably, the BET surface area is determined according to ISO 4652:2012. This preferred BET surface area is more preferably linked to the above-described median particle diameter $D_{50}$ of the talc. It has been found that, in the case of such a combination, the component B) used in accordance with the invention is optimized to the component C) used in accordance with the invention. The specific acid number and molar mass of component C) can minimize the degradation of the polycarbonate caused by component B), since the pores of the talc under these conditions, in particular, are also accessible to the wax C).

More preferably, the talc has a content of ≥96% by weight, more preferably ≥97% by weight, most preferably ≥98% by weight.

It is likewise preferable that the talc has an ignition loss at 1050° C. of 5.0% to 7.0% by weight, more preferably of 5.2 to 6.5% by weight and most preferably of 5.3 to 6.2% by weight. The ignition loss is preferably determined by means of DIN51081:2002.

The talc or talc mixture of component B) is preferably in compacted form.

Component C)

Component C) in the context of the present invention is an anhydride-modified alpha-olefin polymer having an acid number of at least 30 mg KOH/g and a mean molecular weight $M_W$ of 4000 to 40 000 g/mol. It may also be a mixture of various polymers that fulfil the features of component C).

The alpha-olefin polymer preferably contains at least one unit selected from the group consisting of ethylene, 1-propene, 1-butene, 1-isobutene, 1-pentene, 1-hexene, 1-heptene, 1-octene, 1-nonene, 1-decene, 1-undecene, 1-dodecene, 1-tridecene, 1-tetradecene, 1-octadecene, 1-nonadecene and mixtures of these. More preferably, the alpha-olefin polymer contains at least one unit selected from the group consisting of ethylene, 1-propene, 1-octene.

A preferred anhydride as a further unit for modification is an unsaturated carboxylic anhydride, preferably selected from at least one selected from the group consisting of maleic anhydride, phthalic anhydride, fumaric anhydride, itaconic anhydride. Particular preference is given to maleic anhydride.

The anhydride-modified alpha-olefin polymer is preferably rubber-free.

Preferably, the alpha-olefin polymer comprises (component C)

Ca) 90.0%-98.0% by weight, preferably 92.0%-97.5% by weight, more preferably 94.0%-97.0% by weight, of alpha-olefin polymer and Cb) 2.0%-10.0% by weight, preferably 2.5%-8.0% by weight and more preferably 3.0%-6.0% by weight of anhydride.

The olefinic portion Ca) of the alpha-olefin polymer is preferably characterized in that the ethylene content is 80.0%-96.0% by weight, preferably 84.0%-92.0% by weight, the propylene content is 2.0%-10.0% by weight, preferably 4.0%-8.0% by weight, and the octene content is 2.0%-10.0% by weight, preferably 4.0%-8.0% by weight.

Likewise preferably, the olefinic portion Ca) of the alpha-olefin polymer consists of propylene and/or ethylene. Further preferably, the olefinic portion Ca) of the alpha-olefin polymer consists of propylene.

The acid number of the wax of component C) used in accordance with the invention is at least 30 mg KOH/g. Preferably, the acid number is 30 to 110 mg KOH/g, more preferably 40 to 95 mg KOH/g. The acid number was determined by Currenta GmbH by means of potentiometric titration with alcoholic potassium hydroxide solution according to DIN ISO 17025:2005.

The mean molecular weight $M_W$ of the anhydride-modified alpha-olefin polymer is 4000 to 40 000 g/mol, preferably 4000 to 32 000 g/mol, more preferably 4800 to 25 000 g/mol. The molecular weight $M_W$ is determined by means of gel permeation chromatography in ortho-dichlorobenzene at 150° C. with polystyrene calibration. The value reported here is preferably the mean from a double determination.

Preferably, in the case of smaller molecular weights of 4000 to 10 000 g/mol, the acid number is 30 to 65 mg, more preferably 40 to 60 mg KOH/g. More preferably, the molecular weight for the acid number of 30 mg to 65 mg or 40 to 60 mg KOH/g specified in each case is 4500 to 8000 g/mol and especially 5000 to 7000 g/mol.

Preferably, in the case of larger molecular weights of 12 000 to 40 000 g/mol, the acid number is 30 to 100 mg, more preferably 35 to 95 mg KOH/g. More preferably, the molecular weight for the acid number of 30 mg to 100 mg or 35 to 95 mg KOH/g specified in each case is 12 000 to 32 000 g/mol and especially 15 000 to 25 000 g/mol, most preferably 17 500 to 23 000 g/mol.

The combination of the (minimum) acid number and molar mass of the wax C) as specified above is particularly suitable in order to optimize, in particular, the multiaxial impact resistance of mouldings produced from the compositions according to the invention.

Composition

In the composition according to the invention, the amounts of B) and C), prior to the mixing of components A) to C), are matched to one another such that, for every 10 parts by weight of component B), 0.10 to 1.4 parts by weight of component C) are used. Preferably, for every 10 parts by weight of component B), 0.2 to 1.2, more preferably 0.3 to 1.1, parts by weight of component C), most preferably 0.4 to 1.0 part by weight of component C), are used.

Preferably, the composition of the invention contains 5.00% to 45.00% by weight of component B).

More preferably, the composition contains 10.00% to 42.00% by weight, most preferably 13.00 to 40.00% by weight, of component B). The amount of component C) is calculated from the above-specified amounts per 10 parts by weight of component B).

The amount of component B) for high multiaxial impact resistance in combination with good reinforcement (modulus of elasticity) is preferably 5.00% to 31.00% by weight, more preferably 8.00% to 25.00% by weight. The amounts of components A) to C) are each based on the overall composition.

For good multiaxial impact resistance in combination with good thermal conductivity, the amount of component B) is more preferably 18.00% to 40.00% by weight of component B).

The composition is free of graft polymers and polyesters, preferably of impact modifiers other than component C).

"Graft polymers" are especially understood to mean graft polymers having elastomeric properties that are obtainable essentially from at least two of the following monomers: chloroprene, 1,3-butadiene, isoprene, styrene, acrylonitrile, ethylene, propylene, vinyl acetate and (meth)acrylic esters having 1 to 18 carbon atoms in the alcohol components; i.e. polymers as described, for example, in "Methoden der Organischen Chemie" [Methods of Organic Chemistry] (Houben-Weyl), vol. 14/1, Georg Thieme-Verlag, Stuttgart 1961, p. 393-406 and in C. B. Bucknall, "Toughened Plastics", Appl. Science Publishers, London 1977. Graft polymers may be partially crosslinked and have gel contents (measured in toluene) of more than 20% by weight, preferably more than 40% by weight, especially more than 60% by weight, where the gel content is determined at 25° C. in a suitable solvent (M. Hoffmann, H. Kromer, R. Kuhn, Polymeranalytik I and II [Polymer Analysis I and II], Georg Thieme-Verlag, Stuttgart 1977).

Graft polymers are, for example, graft polymers of:

a.i) 5 to 95 parts by weight, preferably 30 to 80 parts by weight, of a mixture of a.i.1) 50 to 95 parts by weight of styrene, α-methylstyrene, methyl ring-substituted styrene, $C_1$- to $C_8$-alkyl methacrylate, especially methyl methacrylate, $C_1$- to $C_8$-alkyl acrylate, especially methyl acrylate, or mixtures of these compounds, and a.i.2) 5 to 50 parts by weight of acrylonitrile, methacrylonitrile, $C_1$- to $C_8$-alkyl methacrylates, especially methyl methacrylate, $C_1$- to $C_8$-alkyl acrylate, especially methyl acrylate, maleic anhydride, $C_1$- to $C_4$-alkyl- or phenyl-N-substituted maleimides or mixtures of these compounds, a.ii) 5 to 95 parts by weight, preferably 20 to 70 parts by weight, of a rubber-containing graft base.

Graft polymers are especially those having a graft base based on a polybutadiene rubber.

Graft polymers are, for example, styrene- and/or acrylonitrile- and/or alkyl (meth)acrylate-grafted polybutadienes, butadiene/styrene copolymers and acrylate rubbers; i.e. copolymers of the type described in DE-A 1 694 173 (=U.S. Pat. No. 3,564,077); polybutadienes grafted with alkyl acrylates or methacrylates, vinyl acetate, acrylonitrile, styrene and/or alkylstyrenes, butadiene/styrene or butadiene/acrylonitrile copolymers, polyisobutenes or polyisoprenes, as described, for example, in DE-A 2 348 377 (=U.S. Pat. No. 3,919,353).

Graft polymers are especially also those obtainable by grafting reaction of
I. at least one (meth)acrylic ester or a mixture of acrylonitrile or (meth)acrylic ester and styrene on
II. a butadiene polymer with butadiene radicals as graft base.

(Meth)acrylic esters I are esters of acrylic acid or methacrylic acid and monohydric alcohols having 1 to 18 carbon atoms, especially methyl, ethyl and propyl methacrylate.

The graft base II may, as well as butadiene radicals, also contain radicals of other ethylenically unsaturated monomers, such as styrene, acrylonitrile, esters of acrylic or methacrylic acid having 1 to 4 carbon atoms in the alcohol component (such as methyl acrylate, ethyl acrylate, methyl methacrylate, ethyl methacrylate), vinyl esters and/or vinyl ethers. A graft base II consists, for example, of pure polybutadiene.

Since, as is well known, the graft monomers are not necessarily entirely grafted onto the graft substrate in the grafting reaction, graft polymers B are also understood in accordance with the invention to include those products obtained by polymerization of the graft monomers in the presence of the graft base.

Graft polymers are, for example, also graft polymers of
(a) acrylate rubber as graft base and
(b) a polymerizable, ethylenically unsaturated monomer, and the homopolymers or copolymers thereof formed in the absence of a) as graft monomers.

The acrylate rubbers (a) of the graft polymer are especially polymers of alkyl acrylates, optionally with other polymerizable, ethylenically unsaturated monomers.

Polymerizable acrylic esters are $C_1$- to $C_8$-alkyl esters, for example methyl, ethyl, n-butyl, n-octyl and 2-ethylhexyl esters and mixtures of these monomers.

Monomers having more than one polymerizable double bond can be copolymerized for crosslinking purposes.

Examples of crosslinking monomers are esters of unsaturated monocarboxylic acids having from 3 to 8 carbon atoms and of unsaturated monohydric alcohols having from 3 to 12 carbon atoms, or of saturated polyols having from 2 to 4 OH groups and from 2 to 20 carbon atoms, for example ethylene glycol dimethacrylate, allyl methacrylate; polyunsaturated heterocyclic compounds, for example trivinyl and triallyl cyanurate; polyfunctional vinyl compounds, such as di- and trivinylbenzenes; and also triallyl phosphate and diallyl phthalate.

Examples of preferred "other" polymerizable, ethylenically unsaturated monomers which can optionally serve alongside the acrylic esters for production of the graft base (a) are acrylonitrile, styrene, α-methylstyrene, acrylamides, vinyl $C_1$-$C_6$-alkyl ethers, methyl methacrylate, butadiene.

Examples of corresponding impact modifiers are ABS (acrylonitrile-butadiene-styrene), SBR (styrene-butadiene rubber) and SAN (styrene-acrylonitrile).

Impact modifiers are also vinyl (co)polymers.

Graft bases are also silicone rubbers.

Impact modifiers are also core-shell systems, for example silicone-acrylic impact modifiers, for instance with a silicone elastomer core and MMA copolymer shell, such as Metablen 5-2001.

Impact modifiers are also optionally functionalized polyolefins of higher molecular weight, including both homo- and copolymers other than component C). In the case of these, the functionalization is effected, for example, by means of aromatic monovinyl monomers, acrylic acids and methacrylic acids and/or esters thereof, conjugated dienes.

Polyesters typically used as impact modifiers are preparable in the broadest sense as condensates from dicarboxylic acids and diols (dialcohols), especially polyethylene terephthalate, polybutylene terephthalate and polyethylene naphthalate, or the copolyester Tritan from Eastman Chemical Company.

More preferably, the composition consists essentially of components A) to C), although customary additives listed hereinafter may be present, and in principle also further constituents that do not have any adverse effect on the desired properties, especially the multiaxial impact resistance. Most preferably, the composition consists of components A) to C) and the additives mentioned below, and is thus especially free of impact modifiers other than component C). "Other than component C)" is referred to as such since anhydride-modified alpha-olefin polymers are sometimes referred to in the literature as impact modifier, but in that case typically in higher amounts and/or with a higher mean molecular weight.

The composition according to the invention preferably comprises at least one additive selected from the group consisting of flame retardants, antidripping agents, thermal stabilizers, demoulding agents, antioxidants, UV absorbers, IR absorbers, antistats, optical brighteners, opacifiers, colorants. These further constituents may be added prior to the mixing of components A) to C), in the course of mixing of components A) to C), or after the mixing of components A) to C).

The additives are optionally present in the composition according to the invention at up to 10.0% by weight, preferably to an extent of 0.10% to 8.0% by weight, more preferably to an extent of 0.2% to 3.0% by weight, where these percentages by weight are based on the total mass of the composition.

Those additives as typically added in the case of polycarbonates are described, for example, in EP-A 0 839 623, WO-A 96/15102, EP-A 0 500 496 or in "Plastics Additives Handbook", Hans Zweifel, 5th Edition 2000, Hamer Verlag, Munich.

Preferred demoulding agents are esters of aliphatic long-chain carboxylic acids with mono- or polyhydric aliphatic and/or aromatic hydroxyl compounds. Particular preference is given to pentaerythritol tetrastearate, glycerol monostearate, stearyl stearate and propanediol distearate, or mixtures thereof.

Preferred UV stabilizers have minimum transmittance below 400 nm and maximum transmittance above 400 nm. Ultraviolet absorbers particularly suitable for use in the composition according to the invention are benzotriazoles, triazines, benzophenones and/or arylated cyanoacrylates.

Particularly suitable ultraviolet absorbers are hydroxybenzotriazoles such as 2-(3',5'-bis(1,1-dimethylbenzyl)-2'-hydroxyphenyl)benzotriazole (Tinuvin® 234, Ciba Spezialitätenchemie, Basle), 2-(2'-hydroxy-5'-(tert-octyl)phenyl)benzotriazole (Tinuvin® 329, Ciba Spezialitätenchemie, Basle), 2-(2'-hydroxy-3'-(2-butyl)-5'-(tert-butyl)phenyl)benzotriazole (Tinuvin® 350, Ciba Spezialitätenchemie, Basle), bis(3-(2H-benztriazolyl)-2-hydroxy-5-tert-octyl)methane, (Tinuvin® 360, Ciba Spezialitätenchemie, Basle), (2-(4,6-diphenyl-1,3,5-triazin-2-yl)-5-(hexyloxy)phenol (Tinuvin® 1577, Ciba Spezialitätenchemie, Basle), and the benzophenones 2,4-dihydroxybenzophenone (Chimasorb® 22, Ciba Spezialitätenchemie, Basle) and 2-hydroxy-4-(octyloxy)benzophenone (Chimassorb® 81, Ciba, Basle), 2-cyano-3,3-diphenyl-2-propenoic acid 2-ethylhexyl ester, 2,2-bis[[(2- cyano-1-oxo-3,3-diphenyl-2-propenyl)oxy]methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, Ciba Spezialitätenchemie, Basle) or tetraethyl 2,2'-(1,4-phenylenedimethylidene)bismalonate (Hostavin® B-Cap, Clariant AG).

Particularly preferred specific UV stabilizers are, for example, Tinuvin® 360, Tinuvin® 350, Tinuvin® 329, Hostavin® B-CAP, more preferably TIN 329 and Hostavin® B-Cap. It is also possible to use mixtures of these ultraviolet absorbers.

In a specific embodiment of the invention, the composition comprises ultraviolet absorbers in an amount of 0 ppm to 6000 ppm, preferably 500 ppm to 5000 ppm, and further preferably 1000 ppm to 2000 ppm, based on the overall composition.

Suitable colorants may be pigments, including inorganic pigments, carbon black and/or dyes. Fillers other than component B) may likewise be added, provided that they do not impair the level of properties of the present invention by their nature and amount. Useful inorganic fillers especially include titanium dioxide, generally in an amount of 0% to 2.5% by weight, based on the sum total of the overall composition, or barium sulfate.

In addition, it is possible to add further constituents which do not impair the level of properties of the present invention by the nature of the constituent and amount thereof.

The polymer compositions according to the invention, comprising the mixed components A) to C) and optionally additives and further constituents, are optionally produced using powder pre-mixes, provided that components B) and C) are indeed first mixed in the melt of component A). With this proviso, it is also possible to use pre-mixes of pellets or pellets and powders with the additives according to the invention. It is also possible to use pre-mixes which have been produced from solutions of the mix components in suitable solvents, in which case homogenization is optionally effected in solution and the solvent is then removed. In this case in particular, the further constituents of the composition according to the invention can be introduced by known processes or as a masterbatch. The use of masterbatches is especially preferred for introduction of additives and further constituents, in which case masterbatches based on the respective polymer matrix in particular are used.

The composition according to the invention can be extruded, for example. The extrudate can be cooled and comminuted after extrusion. The combining and commixing of a pre-mix in the melt can also be effected in the plastifying unit of an injection moulding machine. In this case, the melt is directly converted to a moulded article in the subsequent step.

It has especially been found that the composition according to the invention is particularly suitable for the production of extrudates, preferably for the extrusion of profiles and sheets.

Process

A further aspect of the present invention is a process for sizing talc B) by means of at least one anhydride-modified alpha-olefin polymer as described above as component B), which is characterized in that the sizing is effected during the mixing of the talc or talc mixture B) with at least one polycarbonate and/or copolycarbonate as per the above-described component A) in the melt. Component C) here can either be fed in simultaneously with component B), or component C) is added to component A) before the addition of component B).

This means that, as already elucidated in detail above, component A) is present at least partly in the melt on mixing with components B) and C). In the process according to the invention, components A) to C) as already elucidated in detail above can be used in all preferences and combinations. Preferably, the process according to the invention serves to produce the composition according to the invention. It is particularly preferable here that the amounts of B) and C) are matched to one another such that, for every 10 parts by weight of component B), 0.10 to 1.4 parts by weight of component C) are used. Further preferred embodiments have already been described above and are applicable here too.

It has been found that, surprisingly, in situ sizing, i.e. the adsorption of the wax C) onto the surface of the talc B) only during the mixing with the polycarbonate A), in spite of the fact that the unsized talc C) thus comes at least into partial contact with the polycarbonate A), is sufficient to avoid significant degradation of the polycarbonate A). In this context, the fact that no significant degradation takes place is reflected especially in the excellent mechanical properties of the composition and the resulting moulded articles. Overall, with regard to the production of the composition and mouldings according to the invention, a process step is dispensed with since there is no need for prior sizing/treatment of the talc. This makes the process according to the invention particularly efficient and inexpensive.

In a further aspect of the present invention, a process for improving the multiaxial impact resistance according to DIN EN ISO 6603-2:2002 of a composition comprising A) a polycarbonate and B) talc is provided, wherein the process comprises the step of sizing component B) with an anhydride-modified alpha-olefin polymer C) having an acid number of at least 30 mg KOH/g and a mean molecular weight $M_W$ of 4000 to 40 000 g/mol, wherein the mean molecular weight $M_W$ is determined by means of gel permeation chromatography in ortho-dichlorobenzene at 150° C. with polystyrene calibration, and wherein the amounts of B) and C) are matched to one another such that, for every 10 parts by weight of component B), 0.10 to 1.4 parts by weight of component C) are used. As already elucidated in detail above, it has been found that, surprisingly, the use of a specific wax, preferably in combination with a specific talc B) as described in detail above, leads to mouldings having an improved multiaxial impact resistance.

In the process according to the invention, components A) to C) as already elucidated in detail above can be used in all preferences and combinations. Preferably, the process according to the invention serves to produce the composition according to the invention. The sizing of the talc or talc mixture B) with at least one polycarbonate A) is effected in the melt.

Likewise provided, in a further aspect of the present invention, is a process for increasing the flowability of a composition comprising a polycarbonate A), wherein the process comprises the step of mixing talc B) and an anhydride-modified alpha-olefin polymer C) having an acid number of at least 30 mg KOH/g, determined by means of potentiometric titration with alcoholic potassium hydroxide solution according to DIN ISO 17025:2005, and a mean molecular weight $M_W$ of 4000 to 40 000 g/mol, wherein the mean molecular weight $M_W$ is determined by means of gel permeation chromatography in ortho-dichlorobenzene at 150° C. with polystyrene calibration, with a polycarbonate A). In the process according to the invention, components A) to C) as already elucidated in detail above can be used in all preferences and combinations. Preferably, the process according to the invention serves to produce the composition according to the invention. Especially in relation to the step of mixing, reference is made to the remarks above. It has been found that, surprisingly, on addition of component B) in combination with component C), no reduction in the flowability of the thermoplastic moulding compound according to the invention was observed. By contrast, the flowability of the thermoplastic moulding compound according to the invention exceeded the flowability of the straight component A). This is particularly surprising to the person skilled in the art since the addition of a filler such as talc is normally associated with lowering of the flowability.

In a further aspect, the present invention relates to a moulding comprising the composition according to the invention. The moulding preferably comprises housings or parts of housings in the electronics sector, housings for mobile electronics, protective equipment parts, or bodywork parts in the automotive sector. The mouldings according to the invention are notable for a unique combination of properties of intrinsic thermal conductivity coupled with electrical insulation, high stiffness, high toughness, especially under multiaxial stress, improved flowability and high surface quality on thermoplastic processing.

The present invention likewise provides for the use of the composition according to the invention for production of a moulding, wherein the moulding comprises housings or parts of housings in the electronics sector, housings for mobile electronics, protective equipment parts or bodywork parts in the automotive sector.

The mouldings are suitable for the following applications: vehicle parts or interior trim components for motor vehicles, buses, trucks, mobile homes, rail vehicles, aircraft, water vehicles or other vehicles, cover panels for the construction sector, two-dimensional wall elements, dividing walls, wall protection and edge protection bars, profiles for electrical installation ducts, cable guides, contact rail covers, window and door profiles, furniture parts, traffic signs.

The examples which follow serve to further elucidate the invention.

EXAMPLES

Materials Used:

Material A1: a linear bisphenol A polycarbonate having an MVR (300° C./1.2 kg) of 19 cm$^3$/(10 min) and a mean molecular weight $M_w$ of about 24 000 g/mol from Covestro Deutschland AG.

Material A2: a linear bisphenol A polycarbonate having an MVR (300° C./1.2 kg) of 9 cm$^3$/(10 min) and a mean molecular weight $M_w$ of about 28 000 g/mol from Covestro Deutschland AG.

Material A3: Polysiloxane-polycarbonate block cocondensate with an MVR (300° C.; 1.2 kg) of about 14 cm$^3$/(10 min) and a polydimethylsiloxane content of about 5% by weight; solution viscosity $\eta_{rel}$ 1.26. The block used for preparation of the SiCoPC corresponds to the formula (11);

Material 3: preparation of the polysiloxane-polycarbonate block cocondensate:

Starting Materials:

Polycarbonate:

The starting material used for the reactive extrusion is linear bisphenol A carbonate having end groups based on phenol with a melt volume index of 59-62 cm$^3$/(10 min) (measured at 300° C. with load 1.2 kg according to ISO 1133 (2011)). This polycarbonate does not contain any additives such as UV stabilizers, demoulding agents or thermal stabilizers. The polycarbonate was prepared via a melt transesterification process as described in DE 102008019503. The polycarbonate has a content of phenolic end groups of about 600 ppm.

Siloxane Block:

Hydroquinone-terminated polydimethylsiloxane of the formula (11) with n of about 30 and m in the range from 3 to 4 (R1=H, R2=methyl), with a hydroxyl content of 12 mg KOH/g and a viscosity of 370 mPa·s (23° C.); the sodium content is about 1.5 ppm.

Catalyst:

The catalyst used is tetraphenylphosphonium phenoxide from Rhein Chemie Rheinau GmbH (Mannheim, Germany) in the form of a masterbatch. Tetraphenylphosphonium phenoxide is used in the form of cocrystals with phenol and contains about 70% tetraphenylphosphonium phenoxide. The amounts which follow are based on the substance obtained from Rhein Chemie (as cocrystals with phenol).

The masterbatch is produced as a 0.25% mixture. For this purpose, 18 g of tetraphenylphosphonium phenoxide are spun onto 4982 g in a drum hoop mixer for 30 minutes. The masterbatch is metered in in a ratio of 1:10, such that the catalyst is present with a proportion of 0.025% by weight in the overall amount of polycarbonate.

The block cocondensate is prepared from the polycarbonate component and the siloxane component via a reactive extrusion process according to WO 2015/052110 A1.

Sodium content: The sodium content is determined via mass spectrometry with inductively coupled plasma (ICP-MS).

Material B1: compacted talc having a content of 98% by weight, an iron oxide content of 1.9% by weight, an aluminium oxide content of 0.2% by weight, ignition loss (DIN 51081/1000° C.) of 5.4% by weight, pH (to EN ISO 787-9:1995) of 9.15, D50 (sedimentation analysis) of 2.2 µm; BET surface area according to ISO 4652:2012 of 10 m$^2$/g, brand: Finntalc M05SLC, manufacturer: Mondo Minerals B. V.

Material B2: compacted talc having a content of 99% by weight, an iron oxide content of 0.4% by weight, an aluminium oxide content of 0.4% by weight, ignition loss of 6.0% by weight, pH (to EN ISO 787-9:1995) of 9.55, D50 (sedimentation analysis) of 0.65 µm; BET surface area: 13.5 m$^2$/g, brand: HTP Ultra5c, manufacturer: Imifabi.

Material C1: ethylene-propylene-octene terpolymer with maleic anhydride (ethylene:propylene:octene 87:6:7 (weight ratio)), CAS No. 31069-12-2, with molecular weight (gel permeation chromatography in ortho-dichlorobenzene at 150° C. with polystyrene calibration) $M_w$=6301 g/mol, $M_n$=1159 g/mol, density 940 kg/m$^3$, acid number 53 mg KOH/g, maleic anhydride content 4.4% by weight, based on the terpolymer C1.

Material C2: ethylene-propylene-octene terpolymer with maleic anhydride having a mean molecular weight (gel permeation chromatography in ortho-dichlorobenzene at 150° C. with polystyrene calibration) $M_w$=14 400 g/mol, $M_n$=1880 g/mol, acid number 23 mg KOH/g.

Material C3: propylene-maleic anhydride polymer having a mean molecular weight (gel permeation chromatography in ortho-dichlorobenzene at 150° C. with polystyrene calibration) $M_w$=170 300 g/mol, $M_n$=10 100 g/mol, acid number 6 mg KOH/g.

Material C4: HD polyethylene-maleic anhydride polymer having a mean molecular weight (gel permeation chromatography in ortho-dichlorobenzene at 150° C. with polystyrene calibration) $M_w$=153 500 g/mol, $M_n$=18 500 g/mol, acid number 0 mg KOH/g.

Material C5: propylene-maleic anhydride polymer having a mean molecular weight (gel permeation chromatography in ortho-dichlorobenzene at 150° C. with polystyrene calibration) $M_w$=20 700 g/mol, $M_n$=1460 g/mol, acid number 78 mg KOH/g.

Material C6: propylene-ethylene-maleic anhydride copolymer having a mean molecular weight (gel permeation chromatography in ortho-dichlorobenzene at 150° C. with polystyrene calibration) $M_w$=20 670 g/mol, $M_n$=2081 g/mol, acid number 46 mg KOH/g.

Material C7: ethylene-octene-maleic anhydride copolymer having a mean molecular weight (gel permeation chromatography in ortho-dichlorobenzene at 150° C. with polystyrene calibration) $M_w$=196 000 g/mol, $M_n$=13 140 g/mol, acid number 0.2 mg KOH/g.

Material C8: HD ethylene-maleic anhydride polymer having a mean molecular weight (gel permeation chromatography in ortho-dichlorobenzene at 150° C. with polystyrene calibration) $M_w$ 32 96 550 g/mol, $M_n$=6258 g/mol, acid number 5 mg KOH/g.

Material D: titanium dioxide, sized titanium dioxide, Kronos® 2230 (Kronos Titan GmbH, Germany).

All acid numbers of components C1 to C8 were determined according to DIN ISO 17025:2005 by Currenta GmbH & Co. OHG, Leverkusen, via potentiometric titration with alcoholic potassium hydroxide solution.

Melt volume flow rate (MVR) was determined in accordance with ISO 1133-1:2012 at a test temperature of 300° C., mass 1.2 kg, using a Zwick 4106 instrument from Zwick Roell. The abbreviation MVR stands for the starting melt volume flow rate (after 4 minutes preheating time), and the abbreviation IMVR stands for melt volume flow rate after 19 min.

Relative solution viscosity "eta rel"/"$\eta_{rel}$" was determined by double determination according to ISO1628-1: 2009 with an Ubbelohde viscometer in a concentration of 5 g/l in dichloromethane. The FIGURES reported hereinafter are always the mean values for the relative solution viscosity.

Characteristics from the puncture impact experiment (multiaxial impact resistance) were determined at 23° C. according to DIN EN ISO 6603-2:2002 on test specimens of dimensions 60 mm×60 mm×2 mm.

Charpy impact resistance was measured according to ISO 179/1eU (2010 version) on single-side-injected test bars measuring 80 mm×10 mm×4 mm at 23° C.

Charpy notched impact resistance was measured according to ISO 179/1eA (2010 version) on test specimens of geometry 80 mm×10 mm×4 mm at 23° C.

Vicat softening temperature VST/B50 was determined as a measure of heat distortion resistance to ISO 306 (2014 version) on test specimens of dimensions 80 mm×10 mm×4 mm with a die load of 50 N and a heating rate of 50° C./h with the Coesfeld Eco 2920 instrument from Coesfeld Material test.

Modulus of elasticity and elongation at break were measured according to ISO 527 (1996 version) on single-site-injected dumbbell bars having a core of dimensions 80 mm×10 mm×4 mm at 23° C.

The comparison of the flowability of the thermoplastic moulding compounds was made in each case against the pure component A used in the moulding compounds: the flow path of component A was set to a defined flow length in the mould used (cavity: 2 mm×8 mm×1000 mm). The moulding compounds to be compared were then processed with constant injection moulding parameters (including melt temperature, mould temperature, injection time, injection speed). The moulding was ejected without any further period under hold pressure. The flow length of a moulding compound achieved is the average from 5 flow spirals, where the deviation in a series of flow spirals must not be more than ±10 mm. The flow length achieved is reported as a percentage ratio to the flow length of component A previously established.

Thermal conductivity was determined according to ASTM E1461 (2013 version, Nanoflash method).

The coefficient of linear thermal expansion (CLTE) was determined according to DIN 53752-1980-12.

Fire characteristics are measured according to UL 94 V on bars of dimensions 127 mm×12.7 mm×"reported in the table mm".

The components specified in the tables which follow were compounded either in a twin-screw extruder (Tables 1, 2, 4-6) or in a co-kneader (Tables 3 and 3a), with addition of components B) only at a later stage to components A), C) and optionally D) that have already been melted or dispersed in the melt. C) and D) were metered in simultaneously with A) or immediately after the melting of component A). The compounding was effected within a temperature range from 260° C. to 340° C., based on the melting temperature of component A). Temperatures of 280° C. to 330° C. were used in the twin-screw extruder, and temperatures of 260-280° C. in the co-kneader.

The tables which follow show the compositions and respective results.

TABLE 1

Stabilization of the composition (experiments 1 to 9 (inventive) and comparative experiments V1 to V8)

| Component | | V1 | 1 | 2 | 3 | 4 | 5 | V2 | V3 | V4 |
|---|---|---|---|---|---|---|---|---|---|---|
| (A2) | % by wt. | 79.90 | 79.75 | 79.50 | 79.25 | 79.00 | 78.00 | 77.00 | 100.00 | 77.00 |
| (B1) | % by wt. | 20.00 | 20.00 | 20.00 | 20.00 | 20.00 | 20.00 | 20.00 | 20.00 | 20.00 |
| (C1) | % by wt. | 0.10 | 0.25 | 0.50 | 0.75 | 1.00 | 2.00 | 3.00 | | |
| (C2) | % by wt. | | | | | | | | 1.00 | 2.00 |
| (C5) | % by wt. | | | | | | | | | |
| Method | Unit | | | | | | | | | |
| MVR | cm³/(10 min) | 27.0 | 17.3 | 10.2 | 8.8 | 7.7 | 6.8 | 7.1 | 14.2 | 10.7 |
| IMVR | cm³/(10 min) | 26.6 | 23.9 | 17.5 | 12.7 | 10.4 | 8.1 | 8.5 | 19.9 | 13.6 |

TABLE 1-continued

Stabilization of the composition (experiments 1 to 9 (inventive) and comparative experiments V1 to V8)

| | | | | | | | | | |
|---|---|---|---|---|---|---|---|---|---|
| Relative solution viscosity | | 1.207 | 1.227 | 1.250 | 1.261 | 1.261 | 1.264 | 1.267 | 1.218 | 1.241 |

Puncture impact experiment

| | | | | | | | | | |
|---|---|---|---|---|---|---|---|---|---|
| Maximum force [Fm] | N | 1587 | 2593 | 3887 | 4316 | 4304 | 4151 | 1699 | 3664 | 1553 |
| Energy at maximum force [Wm] | J | 3.4 | 8.1 | 21.7 | 29.1 | 29.3 | 28.4 | 4.8 | 22.4 | 4 |
| Total energy [Wp] | J | 4.0 | 9.4 | 23.8 | 31.5 | 31.9 | 31 | 10.1 | 24.4 | 7.4 |
| Total deformation [Sp] | mm | 5.6 | 7.7 | 11.9 | 13.9 | 14 | 14.2 | 10.4 | 12.1 | 8.7 |
| Charpy | kJ/m² | 55 | 65 | 123 | 185 | 209 | 215 | 296 | 176 | 235 |
| VICAT temperature | °C. | 141.6 | 141.9 | 143.3 | 143.6 | 143.8 | 143.5 | 143.0 | 143.0 | 143.9 |

Tensile test

| | | | | | | | | | |
|---|---|---|---|---|---|---|---|---|---|
| Modulus of elasticity (1 mm/min) | MPa | 4629 | 4786 | 4723 | 4712 | 4834 | 4602 | 4388 | 4635 | 4173 |
| Tensile stress at yield (5 mm/min) | MPa | 66 | 64.4 | 61.4 | 60.4 | 59.5 | 56.3 | 54.7 | 58.1 | 55.5 |
| Tensile strain at yield (5 mm/min) | % | 3.6 | 3.6 | 3.8 | 4.0 | 3.9 | 4.0 | 4.1 | 3.9 | 4.1 |
| Tensile stress at break (5 mm/min) | MPa | 65.8 | 62.5 | 54.7 | 50.2 | 47.5 | 37.4 | 27.1 | 49.2 | 44.6 |
| Tensile strain at break (5 mm/min) | % | 3.5 | 4.6 | 6.4 | 7.9 | 8.3 | 10.2 | 10 | 9 | 20.5 |
| Nominal elongation at break (5 mm/min) | % | 3 | 4 | 5 | 5 | 6 | 7 | 6 | 6 | 12 |

| Component | | V5 | V6 | 6 | 7 | 8 | 9 | V7 | V8 |
|---|---|---|---|---|---|---|---|---|---|
| (A2) | % by wt. | 100.00 | 79.90 | 79.75 | 79.50 | 79.25 | 79.00 | 80.00 | 100.00 |
| (B1) | % by wt. | | 20.00 | 20.00 | 20.00 | 20.00 | 20.00 | 20.00 | |
| (C1) | % by wt. | | | | | | | | |
| (C2) | % by wt. | | 3.00 | | | | | | |
| (C5) | % by wt. | | | 0.10 | 0.25 | 0.50 | 0.75 | 1.00 | |

| Method | Unit | | | | | | | | |
|---|---|---|---|---|---|---|---|---|---|
| MVR | cm³/(10 min) | 8.0 | 25.5 | 13.0 | 9.3 | 7.9 | 7.2 | 25.7 | 8.7 |
| IMVR | cm³/(10 min) | 9.3 | 32.3 | 21.3 | 13.7 | 10.3 | 9.0 | 25.2 | 8.9 |
| Relative solution viscosity | | 1.263 | 1.206 | 1.240 | 1.257 | 1.269 | 1.270 | 1.207 | 1.288 |

Puncture impact experiment

| | | | | | | | | | |
|---|---|---|---|---|---|---|---|---|---|
| Maximum force [Fm] | N | 1490 | 1778 | 3763 | 4498 | 4415 | 4496 | 1234 | 5471 |
| Energy at maximum force [Wm] | J | 4.7 | 4.0 | 19.7 | 31.5 | 30.4 | 32.6 | 2.4 | 56.6 |
| Total energy [Wp] | J | 8.8 | 4.8 | 21.4 | 33.8 | 33.0 | 35.3 | 2.9 | 59.2 |
| Total deformation [Sp] | mm | 10.3 | 5.9 | 11.0 | 14.1 | 14.1 | 14.7 | 5.2 | 19.5 |
| Charpy | kJ/m² | 254 | 57 | 78 | 159 | 201 | 249 | 48 | |
| VICAT temperature | °C. | 142.6 | 141.0 | 143.0 | 144.5 | 145.3 | 145.2 | 141.8 | 145.1 |

Tensile test

| | | | | | | | | | |
|---|---|---|---|---|---|---|---|---|---|
| Modulus of elasticity (1 mm/min) | MPa | 3975 | 4703 | 4898 | 4773 | 4928 | 4895 | 4686 | 2352 |
| Tensile stress at yield (5 mm/min) | MPa | 53.4 | 66.6 | 64.8 | 62.6 | 61.6 | 60.6 | 0 | 61.5 |
| Tensile strain at yield (5 mm/min) | % | 4.4 | 3.8 | 3.7 | 3.9 | 3.9 | 4.0 | 0 | 6.1 |
| Tensile stress at break (5 mm/min) | MPa | 47.3 | 65.5 | 60.5 | 53.8 | 49.6 | 43.7 | 66.1 | 67.3 |

TABLE 1-continued

Stabilization of the composition (experiments 1 to 9 (inventive) and comparative experiments V1 to V8)

| | | | | | | | | | |
|---|---|---|---|---|---|---|---|---|---|
| Tensile strain at break (5 mm/min) | % | 12.5 | 4.5 | 5.5 | 6.9 | 8.4 | 11.1 | 3.4 | 113.6 |
| Nominal elongation at break (5 mm/min) | % | 8 | 4 | 4 | 5 | 6 | 7 | 3.0 | 94 |

Table 1 shows that, depending on the acid number and the amount of component C used, the relative solution viscosity of component A can be stabilized in spite of the presence of component B: the more component C is added and the higher the acid number of component C, the more the solution viscosity approaches the level of the pure component A (V8). The relative solution viscosity of component A) is typically between 1.275 and 1.290. If component C) is absent, the solution viscosity of A) is noticeably lowered (V7).

The observed stabilization of the relative solution viscosity is also manifested by lowering of the MVR and IMVR, and in a smaller difference between IMVR and MVR. The more component C is added and the higher the acid number of component C, the more MVR and IMVR approach the level of the pure component A (V8), and the smaller the difference between IMVR and MVR becomes, which indicates significant attenuation of the molecular weight-reducing reactions at temperature. A noticeable effect on MVR and IMVR only occurs from concentrations of component C) of 0.10 part by weight to 10 parts by weight of component B) (comparison of experiments V7, V8 and V1 with 1 or of V6 with 6).

The use of component C) additionally achieves a significant improvement in the toughness of the moulding compound from 0.10 part by weight of component C) per 10 parts by weight of component B). From concentrations of 1.5 parts by weight of component C) per 10 parts by weight of component B), however, there is a deterioration in puncture impact resistance (multiaxial impact resistance) (puncture impact test; comparison of experiments 5 and V2).

If, moreover, the acid number of component C) is below 30 mg KOH/g, stabilization of the solution viscosity and lowering of the MVR/IMVR are achieved only at higher concentrations of C) (see experiments V3 and V4 compared to V5 and to 4, 5 and 9), although these higher concentrations of C) in turn have an adverse effect on puncture impact resistance.

In virtually all the experiments, it is apparent that good Charpy impact resistance is achieved. However, it also becomes clear that, on the basis of this Charpy impact resistance, no conclusions can be drawn about the multiaxial impact resistance in the puncture impact experiment. These are surprisingly at a high level for the experiments according to the invention only.

Moreover, it can also be seen that the Vicat temperature, within the range of contents of component C) according to the invention, approaches the Vicat temperature of the pure component A) (experiment V8). The higher the acid number and the higher the molecular weight of component C), and the closer the relative solution viscosity to the relative solution viscosity of the pure component A given the same amount of component C), the more marked this tendency is.

Overall, it can thus be inferred from Table 1 that only specific waxes C) having specific acid numbers and molar masses are suitable for achieving a good balance between solution viscosity, Vicat temperature, reinforcement (modulus of elasticity) and multiaxial impact resistance. Especially for multiaxial impact resistance and a high Vicat temperature, the concentration of component C) has an upper limit. If too much of component C) is added, there is a deterioration in multiaxial puncture impact, Vicat temperature and modulus of elasticity; Table 1 experiments 1-5 and 6-9 versus V2-V5, especially 4-5 and 9 versus V3-V4.

TABLE 2

Comparison of different waxes C) (experiments 10 to 12 (inventive) and comparative examples V9 to V12)

| Component | | 10 | V9 | V10 | 11 | 12 | V11 | V12 |
|---|---|---|---|---|---|---|---|---|
| (A1) | % by wt. | 79.00 | 79.00 | 79.00 | 79.00 | 79.00 | 79.00 | 79.00 |
| (B1) | % by wt. | 20.00 | 20.00 | 20.00 | 20.00 | 20.00 | 20.00 | 20.00 |
| (C1) | % by wt. | 1.00 | | | | | | |
| (C3) | % by wt. | | 1.00 | | | | | |
| (C4) | % by wt. | | | 1.00 | | | | |
| (C5) | % by wt. | | | | 1.00 | | | |
| (C6) | % by wt. | | | | | 1.00 | | |
| (C7) | % by wt. | | | | | | 1.00 | |
| (C8) | % by wt. | | | | | | | 1.00 |

TABLE 2-continued

Comparison of different waxes C) (experiments 10 to 12 (inventive) and comparative examples V9 to V12)

| Component | | | 10 | V9 | V10 | 11 | 12 | V11 | V12 |
|---|---|---|---|---|---|---|---|---|---|
| Method | Unit | | | | | | | | |
| MVR | $cm^3$/(10 min) | | 12.7 | 28.5 | 19.9 | 12.1 | 15.0 | 17.4 | 16.9 |
| Puncture impact experiment | | | | | | | | | |
| Maximum force [Fm] | N | | 3286 | 935 | 706 | 3157 | 3123 | 1004 | 922 |
| Energy at maximum force [Wm] | J | | 16 | 1.9 | 1.7 | 13.3 | 12.8 | 2.1 | 2 |
| Total energy MTN | J | | 18.7 | 2.6 | 2.3 | 15.2 | 14.6 | 2.8 | 2.8 |
| Total deformation [Sp] | mm | | 11.5 | 5.2 | 5.7 | 9.9 | 9.7 | 5.5 | 5.6 |
| Charpy | $kJ/m^2$ | | 108 | 44 | 41 | 93 | 93 | 58 | 47 |
| VICAT B | ° C. | | 144.0 | 142.0 | 140.8 | 146.4 | 144.8 | 140.7 | 141.7 |

As can be inferred from Table 2, different components C) lead to different results in the puncture impact experiment. The comparison in Table 2 makes it clear that only with the components C1), C5) and C6) according to the invention having acid number and molar mass according to the invention are good multiaxial impact resistances achieved in combination with high Vicat temperature.

TABLE 3

Properties of the compositions (experiments 13 to 16 (inventive))

| Component | | | 13 | 14 | 15 | 16 |
|---|---|---|---|---|---|---|
| (A1) | | % by wt. | 89.50 | 79.00 | 68.50 | 58.00 |
| (B1) | | % by wt. | 10.00 | 20.00 | 30.00 | 40.00 |
| (C1) | | % by wt. | 0.50 | 1.00 | 1.50 | 2.00 |
| Method | Conditions | Unit | | | | |
| MVR | | $cm^3$/(10 min) | 16.1 | 13.3 | 9.7 | 6.4 |
| Flow path | Flow distance versus A1) | % | 106 | 108 | 108 | 108 |
| VICAT B | | ° C. | 143.9 | 143.4 | 144.0 | 143.3 |
| Thermal conductivity | in plane | W/(mK) | 0.335 | 0.563 | 0.965 | 1.372 |
| | through plane | W/(mK) | 0.217 | 0.228 | 0.25 | 0.282 |
| CLTE | parallel | ppm/K | 51.74 | 42.04 | 36.92 | 30.75 |
| | transverse | ppm/K | 59.24 | 55.52 | 52.1 | 52.15 |
| Puncture impact experiment | | | | | | |
| Maximum force [Fm] | | N | | | 2591 | 683 |
| Energy at maximum force [Wm] | | J | | | 10.4 | 2.3 |
| Total energy [Wp] | | J | | | 12.2 | 3.3 |
| Total deformation [Sp] | | mm | | | 9.4 | 6.4 |
| Charpy | | $kJ/m^2$ | | | 83.5 | 20.1 |

TABLE 3a

Examples 15 and 16 with titanium dioxide:

| Component | | | 15a | 16a |
|---|---|---|---|---|
| (A1) | | % by wt. | 66.50 | 56.00 |
| (B1) | | % by wt. | 30.00 | 40.00 |
| (C1) | | % by wt. | 1.50 | 2.00 |
| (D) | | % by wt. | 2.00 | 2.00 |

TABLE 3a-continued

Examples 15 and 16 with titanium dioxide:

| Method | Unit | | |
|---|---|---|---|
| MVR | $cm^3$/10 min | 9.4 | 4.6 |
| IMVR | $cm^3$/10 min | 11.2 | 5.8 |
| Relative solution viscosity | | 1.254 | 1.255 |
| Puncture impact experiment | | | |
| Maximum force [Fm] | N | 2924 | 670 |
| Energy at maximum force [Wm] | J | 13.2 | 2.2 |
| Total energy [Wp] | J | 15.5 | 3.2 |
| Total deformation [Sp] | mm | 10.8 | 6.9 |
| Charpy | $kJ/m^2$ | 78 | 20 |
| VICAT temperature | °C. | 144.4 | 144.6 |
| Tensile test | | | |
| Modulus of elasticity (1 mm/min) | MPa | 5866 | 7176 |
| Tensile stress at yield (5 mm/min) | MPa | 51.6 | 0 |
| Tensile strain at yield (5 mm/min) | % | 2.9 | 0 |
| Tensile stress at break (5 mm/min) | MPa | 49.5 | 44.8 |
| Tensile strain at break (5 mm/min) | % | 3.6 | 1.3 |
| Nominal elongation at break (5 mm/min) | % | 3 | 1 |
| Thermal conductivity | in plane, W/(mK) | 0.91 | 1.41 |
| | through plane, W/(mK) | 0.23 | 0.28 |
| CLTE | parallel, ppm/K | 35.24 | 31.88 |
| | transverse, ppm/K | 54.03 | 51.20 |

As can be inferred from Table 3, the flow path covered by compositions 13 to 16 in the flow spiral is always constantly higher than the flow path of the pure polycarbonate A, even though the person skilled in the art, on consideration of the MVR values, would actually expect the flowability to fall with rising content of component B). Even in the case of 50% by weight of B), very good flow paths can still be achieved. Inventive examples 13-16 additionally have a unique combination of high flowability and high filler content, with achievement of additional advantageous properties such as thermal conductivity and heat distortion resistance via the filler content. Surprisingly, in spite of addition of component C) which is adsorbed onto the surface of the talc particles, it is nevertheless possible to achieve excellent thermal conductivities of up to 2 W/(mK), based on the area of the injection moulding according to ASTM E 1461:2013. Toughness in the puncture impact experiment remains at a high level in spite of a significant filler content of 30% or 40% by weight of component B) (Examples 15 and 16).

TABLE 4

Properties of the compositions (experiments 17 and 18 (inventive))

| Component | | | 17 | 18 |
|---|---|---|---|---|
| (A2) | | % by wt. | 77.00 | 100.00 |
| (B1) | | % by wt. | 20.00 | |
| (C1) | | % by wt. | 1.00 | |
| (D) | | % by wt. | 2.00 | |
| Method | Conditions | Unit | | |
| MVR | | $cm^3$/(10 min) | 8.7 | 8.7 |
| Flow path | Flow distance versus A2) | % | 115 | 100 |

It can be seen from Table 4 that the improvement in flow path in the case of a more viscous polycarbonate (A2) is much clearer than in the case of a polycarbonate having lower viscosity (comparison with Table 3). Again, there is no correlation of the improved flow path with the MVR obtained.

TABLE 5

Stabilization of a filled polysiloxane-polycarbonate block cocondensate (experiment 19 (inventive) and comparative experiment V13)

| Component | | | V13 | 19 |
|---|---|---|---|---|
| (A3) | | % by wt. | 80.00 | 79.00 |
| (B2) | | % by wt. | 20.00 | 20.00 |
| (C1) | | % by wt. | | 1.00 |
| Method | Conditions | Unit | | |
| MVR | | $cm^3$/(10 min) | 39.1 | 6.7 |
| IMVR | | $cm^3$/(10 min) | 39.3 | 8.4 |
| Relative solution viscosity | | | 1.189 | 1.267 |
| Puncture impact experiment | | | | |
| Maximum force [Fm] | | N | 745 | 3282 |
| Energy at maximum force [Wm] | | J | 1.2 | 17.4 |
| Total energy [Wp] | | J | 1.7 | 21.6 |

TABLE 5-continued

Stabilization of a filled polysiloxane-polycarbonate block cocondensate (experiment 19 (inventive) and comparative experiment V13)

| | | | | |
|---|---|---|---|---|
| Total deformation [Sp] | | mm | 4.8 | 13 |
| Charpy | 23° C. | kJ/m² | 45 | 157 |
| VICAT B | 50 K/h 23° C. | ° C. | 140.3 | 141.9 |
| Tensile test | | | | |
| Modulus of elasticity (1 mm/min) | | MPa | 4341 | 4005 |
| Tensile stress at yield (5 mm/min) | | MPa | 0 | 51.4 |
| Tensile strain at yield (5 mm/min) | | % | 0 | 3.8 |
| Tensile stress at break (5 mm/min) | | MPa | 59.7 | 32.6 |
| Tensile strain at break (5 mm/min) | | % | 2.8 | 14.2 |
| Nominal elongation at break (5 mm/min) | | % | 3 | 9 |

The results in Table 5 demonstrate that, even using a polysiloxane-polycarbonate block cocondensate as component A), stabilization occurs through the inventive in situ sizing of the talc B) by component C1), which becomes apparent from a higher relative solution viscosity and a lower MVR and IMVR. A significant improvement in (multiaxial) impact resistance is also achieved by means of component C) according to the invention.

The invention claimed is:

1. A composition obtained by mixing at least components A) to C), wherein
A) is polycarbonate,
B) is unsized talc and
C) is at least one anhydride-modified alpha-olefin polymer having an acid number of at least 30 mg KOH/g and a mean molecular weight $M_W$ of 4000 to 40 000 g/mol, where the mean molecular weight $M_W$ is determined by means of gel permeation chromatography in ortho-dichlorobenzene at 150° C. with polystyrene calibration and the acid number is determined by means of potentiometric titration with alcoholic potassium hydroxide solution according to DIN ISO 17025:2005,
wherein the amounts of B) and C) prior to mixing are matched to one another such that, for every 10 parts by weight of component B), 0.10 to 1.4 parts by weight of component C) are used, and
wherein the composition is free of polyesters and graft polymers,
wherein the alpha-olefin polymer contains at least one unit selected from the group consisting of ethylene, 1-propene, and 1-octene.

2. The composition according to claim 1, wherein the talc has been compacted.

3. The composition according to claim 1, wherein component C) comprises
Ca) 90.0%-98.0% by weight of alpha-olefin polymer and
Cb) 2.0%-10.0% by weight of anhydride.

4. The composition according to claim 1, wherein the acid number of component C) is 30 to 110 mg KOH/g.

5. The composition according to claim 1, comprising 50% to 94.9% by weight of component A) and 5.00% to 45.00% by weight of component B).

6. The composition according to claim 1, wherein component A) is selected from at least one from the group of the aromatic homopolycarbonates and copolycarbonates or mixtures thereof.

7. The composition according to claim 1, wherein component A) is a siloxane-containing polycarbonate.

8. The composition according to claim 1, wherein the composition comprises at least one further constituent selected from the group consisting of flame retardants, antidripping agents, thermal stabilizers, demoulding agents, antioxidants, UV absorbers, IR absorbers, antistats, optical brighteners, opacifiers, colorants and/or fillers other than talc.

9. A method comprising preparing a moulding from the composition according to claim 1, wherein the moulding is a housing or part of a housing in the electronics sector, a housing for mobile electronics, a protective equipment part or a bodywork part in the automotive sector.

10. A moulding comprising the composition according to claim 1.

11. The composition according to claim 1, wherein component C) comprises:
Ca) 90.0%-98.0% by weight of alpha-olefin polymer and
Cb) 2.0%-10.0% by weight of anhydride, wherein
the olefinic portion Ca) of the alpha-olefin polymer is characterized in that
the ethylene content is 80.0%-96.0% by weight,
the propylene content is 2.0%-10.0% by weight, and
the octene content is 2.0%-10.0% by weight,
or
wherein the olefinic portion Ca) of the alpha-olefin polymer consists of propylene and/or ethylene.

12. A composition consisting of
A) aromatic polycarbonate,
B) talc, the talc used being unsized,
C) at least one anhydride-modified alpha-olefin polymer having an acid number of at least 30 mg KOH/g and a mean molecular weight $M_W$ of 4000 to 40 000 g/mol, where the mean molecular weight $M_W$ is determined by means of gel permeation chromatography in ortho-dichlorobenzene at 150° C. with polystyrene calibration and the acid number is determined by means of potentiometric titration with alcoholic potassium hydroxide solution according to DIN ISO 17025:2005,
and optionally one or more additives selected from the group consisting of flame retardants, antidripping agents, thermal stabilizers, demoulding agents, antioxidants, UV absorbers, IR absorbers, antistats, optical brighteners, opacifiers, colorants,
wherein the amounts of B) and C) prior to mixing are matched to one another such that, for every 10 parts by weight of unsized talc, 0.10 to 1.4 parts by weight of component C) are used,
wherein the alpha-olefin polymer contains at least one unit selected from the group consisting of ethylene, 1-propene, and 1-octene.

13. A process for sizing talc B) by means of a composition comprising at least one anhydride-modified alpha-olefin polymer C) having an acid number, determined by means of potentiometric titration with alcoholic potassium hydroxide solution according to DIN ISO 17025:2005, of at least 30 mg KOH/g and a mean molecular weight $M_W$ of 4000 to 40 000 g/mol, where the mean molecular weight $M_W$ is determined by means of gel permeation chromatography in ortho-dichlorobenzene at 150° C. with polystyrene calibration, wherein the process comprises sizing the talc B) during mixing the talc B) with a polycarbonate A) in the melt, wherein the alpha-olefin polymer contains at least one unit selected from the group consisting of ethylene, 1-propene, and 1-octene, wherein the composition is free of polyesters and graft polymers.

14. The process according to claim 13, wherein the amounts of B) and C) prior to mixing are matched to one another such that, for every 10 parts by weight of component B), 0.10 to 1.4 parts by weight of component C) are used.

15. The process according to claim 13, wherein 5% to 45% by weight of talc is used.

16. The process according to claim 13, wherein component C) comprises:

Ca) 90.0%-98.0% by weight of alpha-olefin polymer and

Cb) 2.0%-10.0% by weight of anhydride, wherein the olefinic portion Ca) of the alpha-olefin polymer is characterized in that the ethylene content is 80.0%-96.0% by weight, the propylene content is 2.0%-10.0% by weight, and the octene content is 2.0%-10.0% by weight, or wherein the olefinic portion Ca) of the alpha-olefin polymer consists of propylene and/or ethylene.

17. A method comprising mixing an anhydride modified alpha-olefin polymer with a composition, the alpha-olefin polymer having an acid number, determined by means of potentiometric titration with alcoholic potassium hydroxide solution according to DIN ISO 17025:2005, of at least 30 mg KOH/g and a mean molecular weight $M_W$ of 4000 to 40 000 g/mol, where the mean molecular weight $M_W$ is determined by means of gel permeation chromatography in ortho-dichlorobenzene at 150° C. with polystyrene calibration, the mixing of the alpha-olefin polymer with the composition for stabilization of polycarbonate in the composition to which unsized talc has been added, wherein, for every 10 parts by weight of the unsized talc, 0.10 to 1.4 parts by weight of the alpha-olefin polymer are used, wherein the alpha-olefin polymer contains at least one unit selected from the group consisting of ethylene, 1-propene, and 1-octene, wherein the composition is free of polyesters and graft polymers.

18. The method according to claim 17, wherein the alpha-olefin polymer comprises:

a) 90.0%-98.0% by weight of alpha-olefin polymer and b) 2.0%-10.0% by weight of anhydride, wherein the olefinic portion a) of the alpha-olefin polymer is characterized in that the ethylene content is 80.0%-96.0% by weight, the propylene content is 2.0%-10.0% by weight, and the octene content is 2.0%-10.0% by weight, or wherein the olefinic portion a) of the alpha-olefin polymer consists of propylene and/or ethylene.

\* \* \* \* \*